(12) United States Patent
Anderson et al.

(10) Patent No.: US 9,745,476 B2
(45) Date of Patent: Aug. 29, 2017

(54) INTUMESCENT COMPOSITION

(71) Applicant: AKZO NOBEL COATINGS INTERNATIONAL B.V., Arnhem (NL)

(72) Inventors: Michael William Anderson, Tyne and Wear (GB); Kevin Jeffrey Kittle, Durham (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 14/903,883

(22) PCT Filed: Jul. 11, 2014

(86) PCT No.: PCT/EP2014/064891
§ 371 (c)(1),
(2) Date: Jan. 8, 2016

(87) PCT Pub. No.: WO2015/007627
PCT Pub. Date: Jan. 22, 2015

(65) Prior Publication Data
US 2016/0160059 A1    Jun. 9, 2016

(30) Foreign Application Priority Data
Jul. 16, 2013  (EP) .................................. 13176653

(51) Int. Cl.
*C09D 163/00*  (2006.01)
*C08K 3/22*    (2006.01)
*C08K 5/057*   (2006.01)
*C09D 5/18*    (2006.01)

(52) U.S. Cl.
CPC ........... *C09D 5/185* (2013.01); *C09D 163/00* (2013.01)

(58) Field of Classification Search
None
See application file for complete search history.

(56) References Cited

U.S. PATENT DOCUMENTS

| 2,684,953 | A | * | 7/1954 | Stilbert, Jr. | ............ | C09D 5/185 |
| | | | | | | 428/921 |
| 3,513,114 | A | * | 5/1970 | Vandersall | ........... | C09D 131/04 |
| | | | | | | 106/18.15 |
| 4,879,320 | A | * | 11/1989 | Hastings | ................ | C09D 5/185 |
| | | | | | | 521/149 |
| 5,356,568 | A | * | 10/1994 | Levine | ................... | C09D 5/185 |
| | | | | | | 106/18.14 |

FOREIGN PATENT DOCUMENTS

WO    WO 2006067478 A1 *  6/2006  ............. C09D 5/185

* cited by examiner

*Primary Examiner* — Peter A Salamon
(74) *Attorney, Agent, or Firm* — McDonnell Boehnen Hulbert & Berghoff LLP

(57) ABSTRACT

The present invention provides a novel intumescent coating composition having excellent intumescent-properties comprising an organic polymer, a spumific and a specific additive, the additive comprising a combination of two different sources of metal/metalloid atoms. Also provided are substrates coated with the intumescent coating composition, a method of preparing an intumescent coating, and a method of protecting structures from heat/fire.

20 Claims, No Drawings

INTUMESCENT COMPOSITION

REFERENCE TO RELATED APPLICATIONS

This application is the U.S. National Phase of PCT/EP2014/064891, filed on Jul. 11, 2014, which is incorporated herein by reference it its entirety, and which claims the benefit of EP Application No. 13176653.7, filed on Jul. 16, 2013.

The present invention relates to a novel intumescent coating composition having excellent intumescent properties, substrates coated with the intumescent coating composition, a method of preparing an intumescent coating composition, and a method of protecting structures from heat/fire.

Many materials, such as steel, rapidly lose their strength and fail in a fire. Structural collapse of "high-rise" office blocks, oil and gas facilities or other infrastructure, and process vessel or pipework rupture as a result of a fire can be catastrophic in terms of escalation of the incident, damage to property, and even loss of life.

Intumescent coatings are used on many structures to delay the effects of a fire. The coating slows the rate of temperature increase of the substrate to which the coating is applied. The coating thus increases the time before the structure fails due to the heat of fire. The extra time makes it more likely that fire fighters will be able to extinguish the fire or at least apply cooling water before the structure fails.

Intumescent coatings generally contain some form of resinous binder, for example an organic binder polymer e.g. a crosslinked polymer such as an epoxy resin or a vinyl toluene/styrene acrylic polymer. The resinous binder forms the hard coating. The binder may also provide a source of carbon, which, in a fire, may be converted to a char.

In addition, intumescent coatings typically contain additives called "spumifics" or "blowing agents" that give off gas in a fire, which causes the char to swell into a foam. Melamine, melamine pyrophosphate, and ammonium polyphosphate can be used as spumifics.

The fire-performance of these coatings is related to the formation, due to the action of heat, of porous char foam which operates as a conventional insulator to the substrate which it coats, increasing the time it takes for the coated structure to fail due to the heat of fire. An improvement in fire performance of an intumescent coating therefore results in an increase in the time it takes for the coated structure to fail due to the heat of fire.

However, in many instances, char foam from an intumescent coating does not have adequate structural strength and is easily destroyed by abrasion or erosion.

In order to improve the strength of a char foam with inadequate strength, various additives such as fibres, silicates, glass reinforcing materials may be added to the intumescent coating composition. See for instance EP 0 568 354. The use of such additives is believed in the art to negatively impact other properties in particular for example, insulating performance of the char by suppressing char expansion. WO 2006/067478 discloses a coating composition comprising at least one of sodium potassium aluminum silicate and potassium aluminum silicate.

As a general rule, it is usually the case that intumescent coatings which produce strong and compact chars, often have poor fire performance. On the other-hand, intumescent coatings which produce highly expanded chars with good fire performance often give weak chars. There is therefore a need to provide an intumescent composition which provides both a strong foam char and also good fire performance.

WO96/03854 describes an intumescent coating system comprising two coating layers. The first coating layer forms a rigid carbonific char foam having a toughness and density, and the second coating layer forms an insulative carbonific char foam having a density about half the density of the char foam of the first coating layer. The first layer is to protect the substrate from break-through and direct exposure to the fire conditions (i.e. strength) and the second layer is to provide insulation. WO96/03854 however fails to teach how to provide both strength and insulation using a single coating composition.

One object of the present invention is therefore to provide an intumescent coating composition, which when applied and dried/cured on a substrate and then when exposed to heat (of a fire), provides both (i) a strong foam layer (to the extent that fibres in the coating or a reinforcing mesh is not necessary) and (ii) also excellent fire performance.

SUMMARY OF THE INVENTION

The present inventors have found that the use of specific amount of metal/metalloid atoms from a combination of at least two different and specific sources of metal/metalloid atoms in an organic intumescent coating composition enhances the fire performance of the intumescent coating and also provides good char strength. However, it was also found that if the composition comprised a too high an amount of metal/metalloid atoms, there was a negative impact on the fire performance of the coating.

Unexpectedly, the inventors have found that providing at least two specific and different sources of metal/metalloid atoms, in specific amounts, synergistically enhances the char strength of the intumescent coating with no diminishing of the fire performance, resulting in a surprisingly superior char foam with respect to both strength and fire performance, compared to if one of these sources were used on their own.

In one embodiment of the invention, the intumescent coating composition comprises an organic polymer, a spumific and an additive, the additive comprising metal/metalloid atoms (derived) from
(a) and/or (b), and
(c) and/or (d),
wherein
(a) is one or more metal/metalloid alkoxide(s) comprising at least one functional group selected from $C_1$-$C_6$-alkyloxy and aryloxy groups;
(b) is one or more hydroxy-functional polysiloxane(s);
(c) is one or more metal/metalloid oxide(s); and
(d) is one or more metal hydroxide(s);
the metal atoms of (a), (c) and (d) are independently selected from selected from Ti, Zr, Al, Zn, Mg, Na, Ca and the metalloid atoms of (a) and (c) are independently selected from Si, or B,
the total sum of (c)+(d) present in the coating composition does not exceed 10.0 weight %,
the total sum of (a)+(b) present in the coating composition does not exceed 50.0 weight %, and
wherein weight % is calculated on the total weight of the non-volatile components in the coating composition.

The Non-Volatile Content (NVC), and hence the total weight of the non-volatile components in the coating composition, can be determined by placing a known weight (e.g. 0.3 g) of coating composition into a pre-weighed aluminum dish and heating the sample in an oven at 105° C. for 30 minutes and reweighing the dish. The non-volatile content can be calculated from the difference in weight between the pre-heated and post-heated sample (ASTM D2697).

Unless otherwise stated herein, all weight % (wt %) values stated herein are calculated on the total weight of the non-volatile components in the coating composition.

When the coating is exposed to heat (for example in a fire, e.g. at temperatures around 90° C. and greater), the coating is pyrolysed, resulting in a strong and hard char layer with excellent thermal protection.

The additive may comprise (a) and/or (b) and a combination of (c) and (d).

The additive may comprise one of the following combinations:
(a)+(c),
(a)+(d),
(a)+(c)+(d),
(b)+(c),
(b)+(d),
(b)+(c)+(d),
(a)+(b)+(c),
(a)+(b)+(d), or
(a)+(b)+(c)+(d).

Preferably, the weight ratio of the sum of (a)+(b) to the sum of (c)+(d) in the additive is from 0.4 to 10.0:1.0, for example from 1.0 to 10.0:1.0, from 1.5 to 10.0:1.0, for example from 0.4 to 7:1.

Preferably, the total sum of (c)+(d) present in the coating composition does not exceed 5.0 weight %, and the total sum of (a)+(b) present in the coating composition does not exceed 20.0 weight %, wherein weight % is calculated on the total weight of the non-volatile components in the coating composition.

Examples of preferred metal/metalloid atoms of (a) are selected from one or more of Si, Ti, Al and/or Zr (Si is a metalloid and Ti, Al and Zr are metals). Preferably therefore the metal atoms of (a) are independently selected from Al, Ti or Zr, and the metalloid atoms of (a) are Si.

Examples of (a) which may be used alone or in combination are: $C_1$-$C_6$-alkoxy or aryloxy orthosilicates, $C_1$-$C_6$-alkoxy or aryloxy orthotitanates, $C_1$-$C_6$-alkoxy or aryloxy aluminates, $C_1$-$C_6$-alkoxy or aryloxy zirconates, or pre-hydrolysed derivatives thereof.

Examples of preferred metal/metalloid atoms of (c) and (d) are selected from one or more of Al, Ti, Si, Mg, Zn, Zr, Na and/or K (Si is a metalloid and Al, Ti, Mg, Zn, Zr, Na and K are metals). Preferably therefore the metal atoms of (c) and (d) are independently selected from one or more of Al, Ti, Mg, Zn, Zr, Na and/or K, and the metalloid atoms of (c) and (d) is Si.

Examples of (c) include one or more of the following: $Al_2O_3$, $Al(OH)_3$, $TiO_2$, $ZnO$, $SiO_2$, aluminum silicate, kaolin and china clay. An example (d) includes $Al(OH)_3$.

The organic polymer may be a thermoplastic organic polymer and/or a thermosetting organic polymer. If the polymer is a thermosetting polymer it preferably has a number average molecular weight ($M_n$) in the range of from 300 to about 3,000. For example, the organic polymer may be an epoxy-functional resin, and the coating composition may further comprise an amine-functional curing agent.

The one or more metal/metalloid alkoxide(s) (a) may for example have the structure according to Figure 1

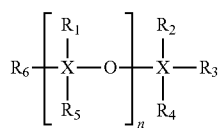

Figure 1 wherein
X is selected from Si, B, Na, Mg, Ti, Zr, Zn, Al,
n is 0 or an integer between 1 and 29; and
$R_1$-$R_6$ are the same or different organic monovalent radicals, wherein at least one of the monovalent radicals organic side groups is a $C_1$-$C_6$-alkyloxy and/or an aryloxy group.

Another embodiment of the invention is a substrate comprising a coating layer formed by applying the intumescent coating composition described herein on the substrate's surface, then allowing the composition to dry and/or cure. Suitably the coating composition drys/cures at ambient temperature (e.g. −5° C. to 40° C.).

Another embodiment of the invention is a method of preparing an intumescent coating composition by adding the additive defined herein to a coating composition comprising an organic polymer and a spumific, wherein the additive is added so that:
the total sum of (c) and (d) present in the coating composition does not exceed 10.0 weight %,
the total sum of (a) and (b) present in the coating composition does not exceed 50.0 weight %,
wherein weight % is calculated on the total weight of the non-volatile components in the coating composition.

Another embodiment of the invention is a method of protecting structures from fire or heat, by coating a structure with the intumescent coating composition as defined herein and allowing the coating composition to form a coating.

A specific example of a coating composition of the invention is a coating composition comprising an organic polymer, a spumific and an additive, the additive comprising metal/metalloid atoms from
(i) a metal/metalloid alkoxide which has a linear M-O backbone, for example having the structure according to Figure 1 (as defined herein)
and
(ii) one or more metal oxide(s), a metalloid oxide(s) and/or a metal hydroxide(s) as defined herein, and preferably wherein the metal/metalloid atoms are selected from Ti, Zr, Al, Zn, Mg, Na, Ca, Si, or B,
and wherein
the total sum of (i) present in the coating composition does not exceed 50.0 weight %, and
the total sum of (ii) present in the coating composition does not exceed 10.0 weight %, and
weight % is calculated on the total weight of the non-volatile components in the coating composition.

DETAILED DESCRIPTION (a) Metal/Metalloid Alkoxide(s) Comprising at Least One Functional Group Selected from $C_1$-$C_6$-Alkyloxy and Aryloxy Groups For the avoidance of doubt, "metal/metalloid alkoxide" means metal alkoxide or metalloid alkoxide.

The metal/metalloid alkoxide comprising $C_1$-$C_6$-alkyloxy and/or aryloxy groups may have a metal/metalloid-oxygen (M-O) backbone with a linear, branched, ladder and/or cage structure. At least one $C_1$-$C_6$-alkyloxy and/or aryloxy group is bonded to the metal/metalloid atoms (M).

For the avoidance of doubt, the metal/metalloid alkoxide may also comprise metal/metalloid-hydroxy (M-OH) bonds.

Suitable $C_1$-$C_6$-alkyloxy groups include, for example, methyloxy, ethyloxy, propyloxy for example n-propyloxy and isopropyloxy, butyloxy for example n-butyloxy, isobutyloxy, sec-butyloxy and tert-butyloxy, pentyloxy, hexyloxy and suitable aryloxy groups include for example, phenyloxy groups.

Suitable metals in the metal alkoxide are sodium (Na), calcium (Ca), magnesium (Mg), titanium (Ti), zirconium (Zr), zinc (Zn), and aluminum (Al). Suitable metalloids include Boron (B), Silicon (Si). A preferred metalloid is silicon (Si).

Preferably, the metal/metalloid atoms (M) of the metal/metalloid alkoxide(s) are selected from Si, Ti, Al or Zr, and most preferably Si. Preferably therefore the metal atoms of the metal alkoxide are selected from Ti, Al or Zr, and the metalloid atoms of the metalloid alkoxide are Si atoms.

The metal/metalloid alkoxide may also comprise other organic side groups, for example, $C_1$-$C_6$ alkyl, aryl, acetoxy, epoxy, oxime, and amine groups.

$C_1$-$C_6$ alkyl groups include methyl, ethyl, propyl for example n-propyl and isopropyl, butyl for example n-butyl, isobutyl, sec-butyl and tert-butyl, pentyl, hexyl. Aryl groups include phenyl groups.

In one embodiment there is only one metal/metalloid atom in the M-O-backbone of the metal/metalloid alkoxide. In another embodiment there may be up to 100 metal/metalloid atoms in the M-O-backbone. The number of metal/metalloid atoms in the M-O-backbone may vary between 1 and 100, more preferably 1 and 50, and most preferably 1 and 30.

The metal/metalloid alkoxide may have a linear M-O backbone, for example having the structure shown in Figure 1

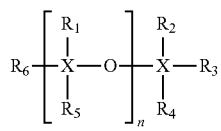

Figure 1 wherein
X is selected from Si, B, Na, Mg, Ti, Zr, Zn, Al, preferably Si, Ti, Al or Zr, and most preferably Si,
n is 0 or an integer between 1 and 29; preferably 0 or an integer between 1 and 19, and most preferably 0 or an integer between 1 and 9; and
$R_1$-$R_6$ are the same or different organic monovalent radicals, wherein at least one of the monovalent radicals organic side groups is a $C_1$-$C_6$ alkyloxy and/or an aryloxy group. Optionally $R_1$-$R_6$ may also be $C_1$-$C_6$ alkyl radicals and/or hydroxyl groups.

More than 20% of $R_1$-$R_6$ groups may be $C_1$-$C_6$ alkoxy and/or aryloxy moieties. More than 40% of $R_1$-$R_6$ groups may be $C_1$-$C_6$ alkoxy and/or aryloxy moieties. Most suitably more than 50% of $R_1$-$R_6$ groups are $C_1$-$C_6$ alkoxy and/or aryloxy moieties. The $C_1$-$C_6$ alkoxy radicals may for example be methoxy and/or ethoxy radicals. For the avoidance of doubt, % of groups means percentage by number (not weight).

Examples of suitable metal alkoxides are (i) $C_1$-$C_6$-alkoxy or aryloxy orthosilicates or pre-hydrolysed derivatives thereof, for example tetramethylorthosilicate, tetraethylorthosilicate tetra(iso)propylorthosilicate, tetrabutylorthosilicate, or prehydrolysed derivatives thereof, (ii) $C_1$-$C_6$-alkoxy or aryloxy orthotitanates or pre-hydrolysed derivatives thereof, for example, tetraethylorthotitanate, tetraisopropylorthotitanate ("titanium isopropoxide"), tetrabutylorthotitanate or pre-hydrolysed derivatives thereof, (iii) $C_1$-$C_6$-alkoxy or aryloxy aluminates or pre-hydrolysed derivatives thereof, for example, aluminum methoxide, aluminum ethoxide, aluminium isopropoxide, Aluminum-tri-sec-butoxide or pre-hydrolysed derivatives thereof, (iv) $C_1$-$C_6$-alkoxy or aryloxy zirconates or pre-hydrolysed derivatives thereof, for example, zirconium propoxide, zirconium butoxide, zirconium tert-butoxide or pre-hydrolysed derivatives thereof, (v) $C_1$-$C_6$-alkoxy or aryloxy polysiloxanes for example Dow Corning US CF 2403/Xiameter RSN 2403, Wacker Silres MSE100, Wacker Silres REN 80, Wacker Silres REN 50.

Particularly suitable the metal/metalloid alkoxides are pre-hydrolysed $C_1$-$C_6$-alkoxyorthosilicates e.g. pre-hydrolysed tetraethylorthosilicate.

(b) Hydroxy-Functional Polysiloxanes

Hydroxy-functional polysiloxanes are compounds having a Si-Oxygen (Si—O) backbone and pendant hydroxyl-functional groups. The Si—O backbone may have a linear, branched, ladder or cyclic structure.

Hydroxy-functional polysiloxanes, in accordance with the present invention, do not comprise alkoxy-functional groups (otherwise they would fall into the category of a metalloid alkoxide (a) when M=Si).

Other organic functional groups that may be present on hydroxy-functional polysiloxane are for example, $C_1$-$C_6$-alkyl groups, aryl, acetoxy, epoxy, oxime, and amine groups.

$C_1$-$C_6$ alkyl groups include methyl, ethyl, propyl for example n-propyl and isopropyl, butyl for example n-butyl, isobutyl, sec-butyl and tert-butyl, pentyl, hexyl. Aryl groups include phenyl groups.

In one embodiment, the hydroxyl-functional polysiloxane is a silanol-functional silicone oil.

In one embodiment, the hydroxyfunctional polysiloxane has a linear Si—O backbone, comprising from 2 to 60 silicon atoms, for example 2 to 30 silicon atoms, or 2 to 15 silicon atoms.

Examples of suitable hydroxyl-functional polysiloxanes include for example; Xiameter OHX-4010 Polymer 400CS and Bluestar Silicones Bluesil Oil 48V3 500.

(c) Metal/Metalloid Oxide(s)

For the avoidance of doubt, "metal/metalloid oxide" means metal oxide or metalloid oxide.

Metal/metalloid oxides are compounds in which metal/metalloid atoms are bonded to oxygen.

Simple metal/metalloid oxides have only one type of metal/metalloid ion, which bonds to an oxide ion ($O^{2-}$) in proportion to balance the charges on the metal/metalloid ion. For example, the magnesium ion $Mg^{2+}$, the aluminium ion $Al^{3+}$ and the silicon ion $Si^{4+}$ combine with the Oxide ion $O^{2-}$ ion to form MgO (Periclase), $Al_2O_3$ (Corundum) and $SiO_2$ (Silica).

Other metal oxides comprise more than one type of metal ion, examples being $MgAl_2O_4$ (Spinel) and $FeTiO_3$ (Ilmenite).

Metal/metalloid oxides in accordance with the present invention do not comprise hydroxy moieties or alkoxy moieties (otherwise they would fall into the categories of (a), (b) or (d)).

Examples of preferred metals in a metal oxide (c) are Al, Ti, Mg, Zn, Zr, Na or K, and more preferably Al, Zn, Ti. A preferred metalloid in a metalloid oxide (c) is Si.

Examples of suitable metal/metalloid oxides which can be used alone or in any combination are $Al_2O_3$, $TiO_2$, ZnO, $SiO_2$, aluminium silicate, kaolin and china clay.

Examples of metal oxide groups:

Periclase Group—includes all metal oxides that have bivalent (two positive charges) metallic ions and the halite structure. In this arrangement each metallic ion is shielded by six oxygen ions around it. Only metallic ions of medium size adopt this structure. Smaller ions are surrounded by four oxygen ions and larger ones by six.

Zincite Group—includes Zincite. The $Zn^{2+}$ are small enough to be adequately shielded by four oxygen ions. Each oxygen in turn is surrounded by four Zn ions. The resulting hexagonal crystal adopts a hemimorphic habit.

Corundum Group—(also commonly called the Hematite Group). Includes the simple metal oxides Corundum ($Al_2O_3$), Hematitie ($Fe_2O_3$) and other metal oxides with the general formula $ABO_3$. All have hexagonal structures with the metal surrounded by six oxygen ions. The metals may be trivalent (eg. $Al^{3+}$) or may be a mixture of bivalent and tetravalent metals such as $Fe^{2+}$ and $Ti^{4+}$, as in Ilmenite.

Spinel Group—They are mixed metal oxides containing a combination of metals with a general formula $AB_2O_4$. Some metals are stabilised by four oxygen atoms in a tetrahedral structure whilst others are stabilised by six in an octahedral arrangement. Still others can occur in both these positions.

Rutile Group—includes all metal oxides with the general formula $MO_2$, in which the metal is tetravalent (carries four positive charges). The metal is surrounded by six oxygen ions, giving rise to the rutile structure. Typically the metals involved are titanium, manganese, tin and lead. Brookite, Anatase and Rutile are polymorphs of titanium dioxide ($TiO_2$) having the same composition but differing in the arrangement of ions in the rutile structure.

The metal/metalloid oxides may be solid. By solid we mean solid in accordance with ASTM D 4359-90.

(d) Metal Hydroxide(s)

Metal hydroxides comprise metal-hydroxy bonds (M-OH bonds). Metal hydroxides may also optionally comprise metal-oxygen bonds (M-O bonds).

Simple metal hydroxides contain one type of metal ion which is bonded to a hydroxide ion ($OH^-$) and optionally also an oxide ion ($O^{2-}$), in proportion to balance the changes on the metal ion.

Some metal hydroxides contain more than one type of metal ion, the metal ions being bonded to a hydroxide ions ($OH^-$) and optionally also an oxide ions ($O^{2-}$), in proportion to balance the changes on the metal ions.

Metal hydroxides in accordance with the present invention, do not comprise alkoxy functional groups (otherwise they would fall into the category of metal alkoxide (a)).

Examples of preferred metals in the metal hydroxides are Al, Ti, Mg, Zn, Zr, Na and/or K. Most suitably, the metal is Al, Zn, and/or Ti.

A particularly suitable metal hydroxide for use in the present invention is $Al(OH)_3$.

Examples of metal hydroxide groups:

Diaspore Group—includes oxyhydroxides of trivalent metals including $Al^{3+}$, $Fe^{3+}$ and $Mn^{3+}$. The general chemical formula is MO(OH). Each metal ion is surrounded by six negative ions, three $O^{2-}$ and three $(OH)^-$. Brucite Group— includes the hydroxides of divalent metals including Magnesium $Mg^{2+}$. The arrangement is octahedral with the metal at the centre. The structure is usually layered, consisting of six hydroxyl (OH)— ions surrounding the metal ion. The layers are stacked upon each other and held together by weak hydrogen bonds.

The metal hydroxides may be solid. By solid we mean solid in accordance with ASTM D 4359-90.

The Additive must Comprise (i) (a) and/or (b), and (ii) (c) and/or (d),

Surprisingly, the inventors found that if (a) and/or (b) is combined with (c) and/or (d), in the amounts defined herein, there is a synergistic improvement in fire performance of the intumescent coating with surprisingly no diminish in the char strength, resulting in a particularly superior char which respect to both strength and fire performance.

For example the additive may comprise the following combinations:

(a)+(c)
(a)+(d)
(a)+(c)+(d)
(b)+(c)
(b)+(d)
(b)+(c)+(d)
(a)+(b)+(c)
(a)+(b)+(d)
(a)+(b)+(c)+(d)

Particularly good performance is achievable when (a) and/or (b) is combined with (c) and/or (d), and the weight ratio of the sum of (a)+(b) to the sum of (c)+(d) in the additive is from 0.4 to 10.0:1.0, for example from 1.0 to 10.0:1.0, from 1.5 to 10.0:1.0, for example 0.4 to 7:1 i.e. (a)+(b):(c)+(d) is 0.4 to 7:1.

The Total Sum of (c)+(d) Present in the Coating Composition must not Exceed 10 Weight %.

The coating composition may comprise (c), (d) or (c)+(d). In all situations, the total sum of (c) and (d) present in the coating composition must not exceed 10.0 weight %. i.e. the maximum amount of (c), or (d), or (c)+(d), that can be present in the coating composition is 10.0 weight %, wherein weight % is calculated on the total weight of the non volatile components in the coating composition.

In a preferred embodiment, the total sum of (c)+(d) present in the coating composition does not exceed 8.0 weight %, does not exceed 6.0 weight % and most preferably does not exceed 5.0 weight %.

Use of (c) and (d) in these low amounts greatly enhances the char strength with no diminish in fire performance of the intumescent coating.

For example, the total weight of (c) and/or (d) in the coating composition may range from 0.1 to 10.0 weight %, from 0.1 to 8.0 weight % or from 1.0 to 6.0 weight %.

For example, the coating composition may comprise one or a combination of $Al_2O_3$ in an amount of 0.1-8.0 weight %, for example 0.5-3.0 weight %, $Al(OH)_3$ in an amount of 0.1-8.0 weight %, for example 0.5-4.0 weight %, and $TiO_2$ in an amount of 0.1-8.0 weight %, for example 1.0-5.0 weight %.

provided that the total weight of (c) ($Al_2O_3$, $TiO_2$) and (d) ($Al(OH)_3$) does not exceed 10.0 weight % preferably does not exceed 8.0 weight %, and further preferably does not exceed 6.0 weight %, and most preferably does not exceed 5.0 weight %, wherein weight % is calculated on the total weight of the non volatile components in the coating composition.

The Total Sum of (a) and (b) Present in the Coating Composition must not Exceed 50 Weight %

It is essential that the total sum of (a)+(b) present in the coating composition does not exceed 50.0 weight %. i.e. the maximum amount of (a), (b) or, (a)+(b) is 50.0 weight %, wherein weight % is calculated on the total weight of the non-volatile components in the coating composition.

Preferably, the total sum of (a)+(b) present in the coating does not exceed 20.0 weight %.

Preferably, the total sum of (c)+(d) present in the coating composition does not exceed 5.0 weight %, and the total sum of (a)+(b) present in the coating composition does not exceed 20.0 weight %, wherein weight % is calculated on the total weight of the non volatile components in the coating composition.

The Organic Polymer

The polymer of the intumescent coating composition has an organic nature. By organic nature, we mean that the polymer contains carbon. This means that an additional charring agent is not an essential component in the coating composition.

The organic polymer may be one or more organic thermoplastic polymer(s), one or more organic thermosetting polymer(s), or a combination of organic thermoplastic polymer(s) and organic thermosetting polymer(s).

Typically, the curable organic thermosetting polymer has a number average molecular weight in the range of from 300 to about 3,000, preferably 300-1000.

Typically, the organic thermoplastic polymer has a number average molecular weight in the range of from 1,000 to about 1,000,000, preferably 10,000 to 500,000, most preferably 50,000 to 250,000.

The number average molecular weight can be measured using gel permeation chromatography in accordance with ASTM method D5296-11.

The coating composition according to all embodiments of the present invention preferably contains from 10 to 80 weight %, more preferably from 15 to 65 weight %, from 20 to 55 weight % and most preferably from 25 to 50 weight % of the organic polymer.

The organic polymer may contain one or more of the following functional groups: epoxy, amine, ester, vinyl, amide, urethane, urea, mercaptan, carboxylic acid, acryloyl, methacryloyl, isocyanate, alkoxysilyl, anhydride, hydroxyl, and alkoxy groups.

Organic thermosetting polymers suitable for use in this composition may be: epoxy-functional resins for example resins based on the diglycidylether of bisphenol A or epoxy-functional polysiloxanes, vinyl ester resins for example, (meth)acrylate resins, vinyl-functional resins, for example vinyl-functional polysiloxanes and unsaturated polyesters, polyols, alkyds, and alkoxysilyl-functional organic resins, or combinations thereof. Suitable epoxy-functional resins include (i) polyglycidyl ethers derived from such polyhydric alcohols as ethyleneglycol, diethyleneglycol, triethyleneglycol, 1,2-propyleneglycol, 1,4-butyleneglycol, 1,5-pentanediol, 1,2,6-hexanetriol, glycerol, trimethylolpropane, bisphenol-A (a condensation product of acetone and phenol), bisphenol-F (a condensation product of phenol and formaldehyde), hydrogenated bisphenol-A, or hydrogenated bisphenol-F, (ii) polyglycidyl ethers of polycarboxylic acids, formed by the reaction of an epoxy compound such as epichlorohydrin with an aliphatic or aromatic polycarboxylic acid such as oxalic acid, succinic acid, glutaric acid, terephthalic acid, 2,6-napthalene dicarboxylic acid, or dimerised linoleic acid, (iii) epoxidised olefinically unsaturated alicyclic materials such as epoxy alicyclic ethers and esters, (iv) epoxy resins containing oxyalkylene groups, (v) epoxy novolac resins, which are prepared by reacting an epihalohydrin (e.g. epichlorohydrin) with the condensation product of an aldehyde with a monohydric or polyhydric phenol (e.g. phenolformaldehyde condensate), (vi) any of the aforementioned epoxy-functional resins modified with polysiloxane side groups, (vii) a silicate modified epoxy resin, for example the reaction product of a tetraalkoxyorthosilicate or a partially condensed oligomer thereof and an epoxy resin containing hydroxyl groups as described in WO 2009/019296, and (viii) mixtures thereof.

The epoxy-functional resin preferably has an epoxy equivalent weight in the range of 100 to 3,000, more preferably 160-1,000 g/eq, and even more preferably 160-500 g/eq.

The organic thermosetting polymers may be (meth)acrylate polymers including polymers having terminal acrylate or methacrylate groups. Examples of suitable (meth)acrylate-functional polymers are urethane acrylates, acrylate or methacrylate esters derived from an epoxy resin, polyol acrylates, polyether acrylates, polyester acrylates, melamine resin acrylate, polyamide acrylate, acrylic polymers having pendant acrylic groups, and silicone acrylates.

The organic thermosetting polymers may be polysiloxanes including (meth)acrylate resins comprising polysiloxane side groups, and those polysiloxanes disclosed in WO 2010/054984 which include epoxy-functional resins.

If the one or more organic polymer(s) are one or more thermosetting polymer(s), the coating composition further comprises one or more curing agent(s) for the thermosetting polymers. The thermosetting polymer(s) forms a coating layer on a substrate by reacting (cross-linking reaction) with the curing agent(s). The choice of curing agent is not particularly limited, except that it must comprise functional groups suitable for reacting with the functional groups on the thermosetting resins in order to affect cross-linking. Determination of a suitable curing agent is within the general skill set and knowledge of a skilled person who formulates coating compositions. For example, for epoxy functional organic resins, suitable curing agents comprise amine, or thiol functional groups, preferably amine functional groups. Suitable examples are phenol resin curing agents, polyamine curing agents, polythiol curing agents, polyanhydride curing agents, and polycarboxylic acid curing agents. "Poly" means that the curing agent comprises 2 or more curable functional groups.

Examples of phenol resin curing agents are phenol novolac resin, bisphenol novolac resin, and poly p-vinylphenol.

Examples of suitable amine curing agents are polyamides, polymeric mannich bases, amine-functional polypropylene or polyethylene oxides, and polysiloxanes containing amine groups. Amine curing agent means that the curing agent comprises one or more —NH or —NH$_2$ groups. Other amine curing agents include aminosilanes, such as alkoxy aminoalkyl silanes 3-aminopropyltriethoxysilane, 3-aminopropyltrimethoxysilane, 3-aminopropyl-methyldimethoxysilane, and 3-aminopropylmethyldiethoxysilane, primary secondary amines such as N-(2-aminoethyl)-3-aminopropyltrimethoxysilane, secondary amines such as N-methyl- or N-phenyl-3-aminopropyltrimethoxy-silane, polyglycolether-modified aminosilanes, and triamino-functional propyltrimethoxysilanes. Similar aminosilanes having two or three silicon atoms can also be used. The amine curing agent may also be an adduct of an epoxy functional compounds and an amine functional compound. Examples of such adducts are provided in WO 2007/082853. Examples of thiol-functional curing agents include pentaerithitol tetrakis(3-mercaptopropionate), polysulphide resins, thiol based curing agents linked to an organic backbone by ether linkages, thiol-functional silanes, such as mercaptopropylthmethoxysilane, mercaptopropyltriethoxysilane, and thiol-functional polysiloxanes.

Examples of polyanhydride curing agents include phthalic anhydride, tetrahydrophthalic anhydride, methyltetrahydrophthalic anhydride, 3,6-endomethylenetetrahydrophthalic anhydride, hexachloroendomethylenetetrahydrophthalic anhydride, and methyl-3,6-endomethylenetetrahydrophthalic anhydride.

Isocyanate curing agents for polyols include for example methylene diphenyl diisocyanate, toluene diisocyanate, hexamethylene diisocyanate, isophorone diisocyanate and polymeric forms and blends of these.

If the coating composition is an ambient temperature curable coating composition comprising one or more thermosetting polymer(s), then the one or more curing agent(s) for the thermosetting polymers would comprise functional groups capable of reacting with the functional groups of the organic thermosetting polymer at ambient temperature. An example of an ambient temperature curable coating composition is a coating composition comprising an epoxy functional resin and amine curing agent.

Coating compositions comprising an epoxy resin, such as a silicate modified epoxy resin, and an amine curing agent have been found to form particularly strong chars having good fire performance (insulation).

Provided the coating composition comprises a thermosetting polymer resin, the curing agent is preferably present in the composition in an amount of 1 to 20 weight %, more preferably 5 to 15 weight %, and most preferably 7 to 12 weight %, wherein weight % is calculated on the total weight of the non-volatile components in the coating composition.

Examples of suitable thermoplastic polymers include any of the following either alone or in combination; vinyl resins (e.g. polymers prepared from one or more unsaturated monomers such as ethylene, propylene, vinyl chloride, dichloroethene, butene, 1,3-butadiene, propene, propyldiene, hexene, hexadiene, hexatriene, acylonitrile, styrene, vinyl acetate, vinyl alcohol), for example ethylene/acrylic acid copolymers, polypropylene and acrylonitrile butadiene styrene copolymer, polyethylene (low density and/or linear low density); polyoxymethylene; polyesters; polyetheramines, and; ethylene/vinyl acetate copolymers.

A Spumific (a "Blowing Agent")

The intumescent coating composition must contain a spumific. A spumific is one or more compounds that, when exposed to heat (usually fire), decomposes and provides expansion gas. Sufficient heat to cause the spumific to decompose and produce gas is usually around 90° C. or more.

It is desirable that the spumific gives off gas at a temperature at which the organic polymer is soft but which is below the temperature at which the char is formed. In this way, the char which is formed is expanded and is a better insulator. It is possible to use spumifics such as melamine, melamine formaldehyde, methylolated melamine, hexamethoxymethylmelamine, melamine monophosphate, melamine biphosphate, melamine polyphosphate, melamine pyrophosphate, dimelamine phosphate, melamine cyanurate, urea, nitrourea, dimethylurea, dicyandiamide, guanylurea phosphate, glycine, or amine phosphate, e.g. ammonium polyphosphate, tris(2-hydroxyethyl)isocyanurate ("THEIC"), azodicarbonamide, 4,4 oxybis(benzene sulfonyl hydrazide), p-toluene hydrazide, p-toluene sulfonylsemicarbazide, dinitrosopentamethylenetetramine, 5-phenyltetrazole, diazoaminobenzene. The foregoing materials release nitrogen gas when they decompose upon exposure to heat. Compounds which release carbon dioxide, water vapour and or ammonia upon exposure to heat can also be used, for example polyphenylene sulphoxide, sodium bicarbonate, zinc carbonate, and citric acid derivatives, boric acid and boric acid derivatives. Expandable graphite can also be used as a spumific.

Preferred spumifics are ammonium polyphosphate and melamine or derivatives thereof, used either alone or in combination.

The spumific is preferably present in the coating composition according to the present invention in an amount of 1 to 30 weight %, more preferably 5 to 20 weight %, and most preferably 7 to 15 weight % (wherein weight % is calculated on the total weight of the non-volatile components in the coating composition).

Optional Components

The coating composition according to all embodiments of the present invention may further comprise a char-forming adjunct as an intumescent ingredient. However, if any of the other ingredients such as the organic polymer or the spumific itself already acts as char-forming adjunct (such as ammonium polyphosphate), an additional char-forming adjunct may not be required.

A char-forming adjunct promotes the formation of a char when the composition is exposed to fire. Lewis acids are believed to perform this function. Preferably, phosphorus compounds such as ammonium phosphates, phosphonatosilanes, more preferably ammonium polyphosphate, or phosphoric acid are used. It is also possible to use other char-forming adjuncts instead of or in addition to phosphorus containing compounds. Ammonium polyphosphate can be used optionally in conjunction with tris-(2-hydroxyethyl) isocyanurate (THEIC).

The char-forming adjunct may be present in the coating composition in an amount of 10 to 70 weight %, more preferably 25 to 60 weight %, and most preferably 40 to 60 weight % (wherein weight % is calculated on the total weight of the non volatile components in the coating composition).

The intumescent coating composition according to all embodiments of the present invention may further comprise an additional source of carbon, i.e. additional to the optional organic resin. Examples of suitable additional carbon sources are pentaerythritol, dipentaerythritol, polyvinyl alcohol, starch, cellulose powder, hydrocarbon resins, chloroparaffins, and phosphated plasticisers.

The composition according to all embodiments of the invention may also contain a compound which acts as a catalyst for accelerating the curing reaction of the thermosetting organic polymer.

Some of the components (a) (b) (c) or (d) may act as a catalyst, and if so, there may be no need for an extra catalyst in the coating composition. For example a catalysts for moisture curing systems include alkoxytitanium, alkoxyaluminum and alkoxy zirconium compounds.

Other suitable catalysts for moisture curing systems are organotin compounds organic salts, such as carboxylates, of bismuth, for example bismuth tris(neodecanoate). Organic salts and/or chelates of other metals such as zinc, aluminium, zirconium, tin, calcium, cobalt, or strontium, for example zirconium acetylacetonate, zinc acetate, zinc acetylacetonate, zinc octoate, stannous octoate, stannous oxalate, calcium acetylacetonate, calcium acetate, calcium 2-ethylhexanoate, cobalt naphthenate, calcium dodecylbenzene sulphonate, or aluminium acetate, 1,8-di-azabicyclo-[5.4.0]undec-7-ene may also be effective as catalysts.

Examples of catalysts known to speed up the curing reaction between an epoxy resin and the curing agent include the following alcohols, phenols, carboxylic acids, sulphonic acids, and salts:

Alcohols: Ethanol, 1-propanol, 2-propanol, 1-butanol, 2-butanol, t-butanol, benzyl alcohol, furfuryl alcohol, and other alkyl alcohols, propanediol, butanediol, glycerol and other polyhydric alcohols, triethanolamine, tri-isopropanolamine, dimethylaminoethanol and other hydroxy tertiary amines.

Phenols: Phenol, 2-chlorophenol, 4-chlorophenol, 2,4-dichlorophenol, 2,4,6-trichlorophenol, 2-nitrophenol, 4-nitrophenol, 2,4-dinitrophenol, 2,4,6-trinitrophenol, 4-cyanophenol, o-cresol, m-cresol, p-cresol, 4-ethylphenol, 4-isopropylphenol, 2,4-dimethylphenol, 3,5-dimethylphenol, nonyl phenol, eugenol, isoeugenol, cardanol and other alkylated phenols, 2,2'-dihydroxybiphenyl, 2,4'-dihydroxybiphenyl, 4,4'-dihydroxybiphenyl, bisphenol A, bisphenol F, catechol, 4-t-butyl catechol, resorcinol, 4-hexylresorcinol, orcinol, hydroquinone, naphthalenediol, anthracenediol, biphenylenediol and other substituted dihydric phenols, phloroglucinol, phloroglucide, calixarene, poly(4-vinylphenol) and other polyhydric phenols.

Carboxylic acids: acetic acid, propanoic acid, butyric acid, lactic acid, phenyl acetic acid and other alkyl carboxylic acids, malonic acid, oxalic acid, maleic acid, fumaric acid and other dibasic acids or their monoesters, benzoic acid, 4-t-butyl benzoic acid, salicylic acid, 3,5-dichlorosalicylic acid, 4-nitrobenzoic acid and other aromatic acids.

Sulphonic acids: Methanesulphonic acid and other alkyl sulphonic acid, p-toluenesulphonic acid, 4-dodecylbenzenesulphonic acid, and other aromatic sulphonic acids, naphthalene disulphonic acid, di-nonyl naphthalene disulphonic acid and other polyhydric sulphonic acids.

The composition of the invention may further contain solvents, pigments and thickening agents. Again, some compounds falling into the definitions of (a) (b) (c) and (d) may act as a pigment and/or a thickening agent, and if so additional pigments/thickening agents may not be required (and, of course, may not be added in amounts so that the total amount of (a)(b)(c) and (d) exceeds the levels permitted by the present invention).

Examples of suitable solvents are di-methylbenzene and tri-methylbenzene.

Examples of pigments are titanium dioxide (white pigment), coloured pigments such as carbon black, one or more strengthening pigments such as fibres, e.g. ceramic fibre, glass fibre, or carbon fibre, one or more anticorrosive pigments such as wollastonite or a chromate, molybdate, phosphate or phosphonate, and/or a filler pigment such as barytes, talc or calcium carbonate.

Examples of thickening agents include fine-particle silica, bentonite clay, hydrogenated castor oil, or polyamide wax, one or more plasticisers, pigment dispersants, stabilisers, surface modifiers, flame retardants, antibacterial agents, antimoulds, low density fillers, endothermic fillers, char promoters, fluxing aids, and leveling agents.

Fibres may be present in the composition. However their presence is not required to obtain a hard char. One embodiment of the present invention is therefore a intumescent coating composition that does not contain fibres or contains less than 3 weight % of fibres.

In addition, the composition may contain one or more additional organic resins/polymers, which may or may not contain functional groups.

Use and Application

The present invention further relates to the use of the intumescent coating composition as described and claimed herein to protect structures from fire.

The present invention further relates to a substrate comprising a layer formed by applying the intumescent compositions described and claimed herein on the substrate's surface, followed by curing said composition to form a coating.

The dry film thickness of the layer of intumescent coating is typically between 100 μm and 8 mm, preferably 200 μm and 4 mm, for cellulosic fire applications. For hydrocarbon fire applications the dry film thickness layer of intumescent coating is typically between 500 μm to 50 mm, preferably 1 mm to 25 mm. The dry film thickness may be measured using an Elcometer 355 Coating Thickness Gauge.

The composition according to the invention may be applied as a topcoat, directly to the substrate, or as an intermediate coat (between the top coat and a primer). Hence, when applying the composition according to the present invention, there may be no need for a separate protective layer to protect the substrate, for example, from corrosion. And since the coating of the invention may also have good protective properties and aesthetic appearance, it could be used without a separate topcoat to improve appearance and/or protect the intumescent layer against the effects of atmospheric weathering.

The coating composition is typically a liquid when it is applied. The coating composition is typically applied at ambient temperatures, although may be heated upon application (for example up to 60° C., to reduce it's viscosity). Liquid coating compositions may be applied by conventional methods, for example by airless spray, by pouring (used in molds), brushing or troweling.

Typically, the viscosity of the coating composition is suitable to allow effective atomisation and droplet formation under the high shear conditions associated with plural component airless spray application techniques at ambient temperature. The coating composition however may be preheated up to temperatures of 50 or 60° C. in the airless spray equipment to reduce the viscosity of the coating composition.

The intumescent coating composition may be applied in one, or in two or more packs. For example it may be supplied in two packs, in which case the curing agent is supplied in a different package to the organic thermosetting polymer. For example, the coating composition may comprise a first pack comprising one or more thermosetting polymer(s) and a second pack comprising one or more curing agent(s) for the thermosetting polymer(s). The first pack and the second pack are mixed together prior to application on the substrate.

The composition may cure and/or dry at ambient temperatures, for example −5° C. to 40° C. and if so, is suitable for application to large structures where heat-curing is impractical when the temperature is low. The composition of the invention alternatively may be cured and/or dried at elevated temperatures, for example from 40° C. or 50° C. up to 100° C. if so desired. The hydrolysis of silicon-bonded alkoxy groups depends on the presence of moisture: in almost all climates atmospheric moisture is sufficient, but a controlled amount of moisture may need to be added to the composition when curing at sub-ambient temperature or when curing in very low humidity (desert) locations. The water is preferably packaged separately from any compound containing metal/metalloid (usually silicon)-bonded alkoxy groups. The composition according to all embodiments of the present invention preferably has a solids content of at least 50% by weight (wt %), more preferably at least 80 wt %, and most preferably at least 85 wt %, based on the total weight of the composition. The solids content is based upon a theoretical calculation of the solvent in the formulation excluding that which would be released upon curing.

The Volatile Organic Content (VOC) of the coating composition as present in a paint can (that is: prior to cure)

preferably does not exceed 250 g/l and most preferably is less than 100 g/l solvent per liter of the composition. The VOC may be calculated.

The above values refer to those of the complete composition. Hence, for a composition that has the form of a 2-pack composition, they refer to the solids content and the VOC of the composition after the two packs have been combined.

The composition according to all embodiments of the present invention can be applied on various substrates. It is particularly suitable to be applied on metal substrates, more in particular steel substrates. Due to the strength of the char, the intumescent is particularly suitable for protecting structures from hydrocarbon fires, for example jet fires, i.e. high-temperature, high heat flux, high-velocity flames. Some compositions according to the present invention can thus also be applied to substrates in zones exposed to jet-fires.

The composition can be applied by conventional methods for applying intumescent compositions, such as spraying or troweling. The invention will be elucidated with reference to the following examples. These are intended to illustrate the invention but are not to be construed as limiting in any manner the scope thereof.

EXAMPLES

Sample Preparation—Coating Compositions 1 to 4

Coating compositions 1 to 4 were made by first mixing together all the components listed in Table 1 except for the curing agent by high speed dispermat. The polyamide curing agent was then added and each test intumescent coating compositions were then applied to grit blasted primed steel panels. Compositions 1 to 3 are comparative examples, and composition 4 is in accordance with the invention.

TABLE 1

| Component (wt %) | Composition No | | | |
|---|---|---|---|---|
| | 1* | 2* | 3* | 4 |
| Epoxy Resin (DER331) | 23.5 | 21.0 | 23.3 | 20.8 |
| Pre-hydrolysed Tetraethylorthosilicate (metalloid alkoxide) | 0.0 | 5.3 | 0.0 | 5.2 |
| Titanium isopropoxide (metal alkoxide) | 0.0 | 0.0 | 0.0 | 0.0 |
| Aluminium Oxide (metal oxide) | 0.0 | 0.0 | 2.2 | 2.2 |
| Aluminium Hydroxide (metal hydroxide) | 0.0 | 0.0 | 0.0 | 0.0 |
| Dispersant | 1.2 | 1.4 | 1.2 | 1.4 |
| Xylene solvent | 1.2 | 1.4 | 1.2 | 1.4 |
| Ammonium Polyphosphate | 51.7 | 50.5 | 50.2 | 49.0 |
| Melamine | 10.7 | 10.4 | 10.4 | 10.1 |
| Polyamide Curing Agent | 11.7 | 10.0 | 11.6 | 9.9 |

*Comparative Examples

For the furnace testing, the steel panels were 300×300×5 mm. The dry film thicknesses of the coatings were 4 mm, measured using an Elcometer 355 Coating Thickness Gauge.

The coatings were allowed to cure at ambient temperature for 24 hours before testing.

Furnace Testing of Composition Examples 1 to 4 (Hydrocarbon Heating Curve)

Five thermocouples were attached to the back of each coated steel panel of coating Examples 1 to 4. Panels were mounted vertically in a 1.5 m³ furnace operated under a Hydrocarbon heating curve as described in BS476. The average thermocouple reading was calculated throughout the test and the Time to Failure recorded as the time when the average thermocouple temperature reached 500° C. The results are in Table 2.

TABLE 2

Results of Furnace testing - Hydrocarbon heating curve

| Composition No | Time to Failure (min) |
|---|---|
| Example 1 | 23 |
| Example 2 | 36 |
| Example 3 | 46 |
| Example 4 | 53 |

Sample Preparation—Coating Compositions 5 (in Accordance with the Invention)

Coating composition 5 was made by first mixing together all the components listed in Table 3 except for the curing agent by high speed dispermat. The polyamide curing agent was then added and each test intumescent coating compositions were then applied to grit blasted primed steel panels.

TABLE 3

| Component (wt %) | |
|---|---|
| Epoxy Resin (DER331) | 15.9 |
| Pre-hydrolysed Tetraethylorthosilicate (metalloid alkoxide) | 4.0 |
| Titanium isopropoxide (metal alkoxide) | 7.1 |
| Aluminium Oxide (metal oxide) | 0.8 |
| Aluminium Hydroxide (metal hydroxide) | 1.2 |
| Dispersant | 1.3 |
| Xylene solvent | 1.3 |
| Ammonium Polyphosphate | 50.4 |
| Melamine | 10.4 |
| Polyamide Curing Agent | 7.6 |

For the furnace testing, the steel panel was 300×300×5 mm. The dry film thicknesses of the coating was 4 mm, measured using an Elcometer 355 Coating Thickness Gauge.

The coating was allowed to cure at ambient temperature for 24 hours before testing.

Furnace Testing of Composition Example 5 and Comparison with a Commercial Epoxy Based Intumescent (Cellulosic Heating Curve)

Fire-performance provided by Composition Example 5 and a commercial epoxy based intumescent was assessed according to BS476.

Five thermocouples were attached to the back of each coated steel panel. Panels were mounted vertically in a 1.5 m³ furnace operated under a Cellulosic heating curve as described in BS476. The average thermocouple reading was calculated throughout the test and the Time to Failure recorded as the time when the average thermocouple temperature reached 500° C. The results are in Table 4.

TABLE 4

Results of Furnace testing - Cellulosic heating curve

| Composition No | Time to Failure (min) |
|---|---|
| Example 5 | 81 |
| Leading commercial epoxy based intumescent | 74 |

Sample Preparation—Coating Compositions 6 and 7

Coating compositions 6 and 7 were made by first mixing together all the components listed in Table 5 except for the curing agent by high speed dispermat. The polyamide curing agent was then added and each test intumescent coating compositions were then applied to grit blasted primed steel panels. Composition 7 is a comparative example, composition 6 is in accordance with the invention.

TABLE 5

| Component (wt %) | Composition No | |
| --- | --- | --- |
|  | 6 | 7* |
| Epoxy Resin (DER331) | 19.8 | 18.5 |
| Pre-hydrolysed Tetraethylorthosilicate (metalloid alkoxide) | 5.0 | 4.6 |
| Titanium isopropoxide (metal alkoxide) | 0.0 | 0.0 |
| Aluminium Oxide (metal oxide) | 0.0 | 0.0 |
| Aluminium Hydroxide (metal hydroxide) | 1.6 | 30.7 |
| Dispersant | 1.3 | 1.3 |
| Xylene solvent | 1.3 | 1.3 |
| Ammonium Polyphosphate | 51.1 | 28.9 |
| Melamine | 10.4 | 10.6 |
| Polyamide Curing Agent | 7.6 | 9.4 |

*Comparative Example

For the cone calorimeter testing, the coating compositions were applied to 100×100×4 mm steel panels. The dry film thicknesses of the coatings were 700 μm.

The coatings were allowed to cure at ambient temperature for 24 hours before testing Cone Calorimeter Thermal Testing of Composition Examples 6 and 7

The relative fire protection capability of coatings of Examples 6 and 7 was determined by the cone calorimeter thermal technique, which is a laboratory based technique cited in several peer reviewed academic papers. (Bartholmai, M; Schartel, B; FRPM '05, BAM, Berlin, Germany 7-9 Sep. 2005).

The technique used a heating cone (diameter 160 mm) providing a heat flux of 50 KW/m² to simulate a fire. A thermocouple was taped to the non coated side of the coated panel panel, and then the panel was placed in a sample holder which leaves the painted surface open to the cone heater. The thermocouple was attached to a Grant 2020 series squirrel data logger to read the evolution of temperature as the coated side was heated. The sample was placed at a distance of 25 mm from the edge of the cone. The Time to Failure of the sample is taken as the time it takes for the thermocouple to register a back face temperature of 400° C. The results are in Table 6.

TABLE 6

Results of Cone Calorimeter testing

| Composition No | Time to Failure (min) |
| --- | --- |
| Example 6 | 44 |
| Example 7 | 5 |

Char Strength Testing—Comparative Test of Coating of Present Invention (Example 4) vs. Commercial Epoxy Based Intumescent A Mecmesin AFG 100N force meter was used to measure the strength of the char of coating of Example 4 produced by furnace testing, and the strength of a char from a leading commercial epoxy-based intumescent produced by furnace testing.

Prior to testing, the chars were allowed to cool to ambient temperature. The cooled char were then placed under a force gauge plunger (diameter 20 mm) of a Mecmesin AFG 100N force meter. A stepper motor was used to drive the plunger into the chars at a constant rate. The resistive force exerted on the plunger by the char was recorded on a Grant 2020 series squirrel data logger as the plunger proceeds from the surface of the char towards the steel substrate. The higher the resistance of the char to the force of the plunger, the harder the char, and the higher the reading from the force meter. The test results are in Table 7.

TABLE 7

Results of Char strength testing

| | Resistive force/N | | |
| --- | --- | --- | --- |
| Composition No | At 30% compression | At 50% compression | At 70% compression |
| Example 4 | 7 | 17 | 19 |
| Leading commercial epoxy based intumescent | 0.2 | 1 | 13 |

Discussion of Results

Table 2 shows that addition of small amounts of metalloid alkoxide or small amounts of metal oxide to the coating compositions improves thermal performance.

Surprisingly however, the combination of both metalloid alkoxide and metal oxides (see composition 4) significantly improves thermal performance of the coating.

Table 4 shows that the thermal performance of Example 5, when tested under cellulosic fire conditions, is superior to that of a leading commercial epoxy based intumescent.

The improvement in thermal performance provided by the metal oxide in the coating in examples 1-4 (see Table 2) would lead one intuitively to increase the level of metal oxide. Fire retardant systems based on high levels of aluminium trihydrate are known. However the results in Table 6 show that a coating comprising the level of metal oxide (this high amount is typically used in fire retardant coatings) dramatically decreases the fire performance of the coating. Composition 6 which comprises only a small amount of metal hydroxide, on the other hand, provides better thermal protection than composition 7 which comprises a large amount of metal hydroxide.

Table 7 shows that the char strength of the char produced by a coating according to the present invention is superior to that of the leading commercial epoxy based intumescent.

The invention claimed is:

1. An intumescent coating composition comprising an organic polymer, a spumific and an additive, the additive comprising metal/metalloid atoms from
(a) and/or (b), and
(c) and/or (d)
wherein
(a) is one or more metal/metalloid alkoxide(s) comprising at least one functional group selected from $C_1$-$C_6$-alkyloxy and aryloxy groups;
(b) is one or more hydroxy-functional polysiloxane(s);
(c) is one or more metal/metalloid oxide(s); and
(d) is one or more metal hydroxide(s);
wherein the metal atoms of (a), (c) and (d) are independently selected from the group consisting of Ti, Zr, Al, Zn, Mg, Na and Ca, and the metalloid atoms of (a) and (c) are independently selected from the group consisting of Si and B;

wherein the total sum of (c)+(d) present in the coating composition does not exceed 10.0 weight %;

wherein the total sum of (a)+(b) present in the coating composition does not exceed 50.0 weight %; and wherein weight % is calculated on the total weight of the non volatile components in the coating composition.

2. The intumescent coating composition of claim 1, wherein the additive comprises (c) and (d).

3. The intumescent coating composition of claim 1, wherein the additive comprises one of the following combinations:
(a)+(c),
(a)+(d),
(a)+(c)+(d),
(b)+(c),
(b)+(d),
(b)+(c)+(d),
(a)+(b)+(c),
(a)+(b)+(d), or
(a)+(b)+(c)+(d).

4. The intumescent coating composition of claim 1, wherein the weight ratio of the sum of (a)+(b) to the sum of (c)+(d) in the additive ranges from 0.4 to 10.0:1.0.

5. The intumescent coating composition of claim 1, wherein the total sum of (c)+(d) present in the coating composition does not exceed 5.0 weight %, and the total sum of (a)+(b) present in the coating composition does not exceed 20.0 weight %.

6. The intumescent coating composition of claim 1, wherein the metal atoms of (a) are independently selected from the group consisting of Al, Ti and Zr, and the metalloid atoms of (a) are Si.

7. The intumescent coating composition of claim 1, wherein (a) is selected from any one or more of: $C_1$-$C_6$-alkoxy or aryloxy orthosilicates, $C_1$-$C_6$-alkoxy or aryloxy orthotitanates, $C_1$-$C_6$-alkoxy or aryloxy aluminates, $C_1$-$C_6$-alkoxy or aryloxy zirconates, or pre-hydrolysed derivatives thereof.

8. The intumescent coating composition of claim 1, wherein the metal atoms of (c) and (d) are independently selected from the group consisting of Al, Ti, Mg, Zn, Zr, Na and K, and the metalloid atoms of (c) and (d) are Si.

9. The intumescent coating composition of claim 1, wherein (c) is selected from one or more of the following: $Al_2O_3$, $Al(OH)_3$, $TiO_2$, ZnO, $SiO_2$, aluminum silicate, kaolin and china clay.

10. The intumescent coating composition of claim 1, wherein (d) is $Al(OH)_3$.

11. The intumescent coating composition of claim 1, wherein the organic polymer is an epoxy-functional resin, and the intumescent coating composition further comprises an amine-functional curing agent.

12. The intumescent coating composition of claim 1, wherein the one or more metal/metalloid alkoxide(s) (a) has the structure according to Figure 1

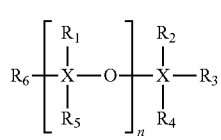

Figure 1 wherein

X is selected from the group consisting of Si, B, Na, Mg, Ti, Zr, Zn and Al;

n is 0 or an integer between 1 and 29; and $R_1$-$R_6$ are the same or different organic monovalent radicals, wherein at least one of the monovalent radicals organic side groups is a $C_1$-$C_6$-alkyloxy and/or an aryloxy group.

13. A substrate comprising a coating layer formed by applying the intumescent coating composition of claim 1 on the substrate's surface, then allowing the composition to dry and/or cure.

14. A method of preparing the intumescent coating composition of claim 1, the method comprising by adding the additive to a coating composition comprising the organic polymer and the spumific.

15. A method of protecting structures from fire or heat, the method comprising coating a structure with the intumescent coating composition of claim 1, and allowing the coating composition to form a coating.

16. The intumescent coating composition of claim 5, wherein the metal atoms of (a) are independently selected from the group consisting of Al, Ti and Zr, and the metalloid atoms of (a) are Si.

17. The intumescent coating composition of claim 5, wherein (a) is selected from any one or more of: $C_1$-$C_6$-alkoxy or aryloxy orthosilicates, $C_1$-$C_6$-alkoxy or aryloxy orthotitanates, $C_1$-$C_6$-alkoxy or aryloxy aluminates, $C_1$-$C_6$-alkoxy or aryloxy zirconates, or pre-hydrolysed derivatives thereof.

18. The intumescent coating composition of claim 5, wherein (c) is selected from one or more of the following: $Al_2O_3$, $Al(OH)_3$, $TiO_2$, ZnO, $SiO_2$, aluminum silicate, kaolin and china clay.

19. The intumescent coating composition of claim 5, wherein the organic polymer is an epoxy-functional resin, and the intumescent coating composition further comprises an amine-functional curing agent.

20. The intumescent coating composition of claim 5, wherein the one or more metal/metalloid alkoxide(s) (a) has the structure according to Figure 1

Figure 1

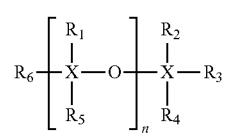

wherein

X is selected from the group consisting of Si, B, Na, Mg, Ti, Zr, Zn and Al;

n is 0 or an integer between 1 and 29; and $R_1$-$R_6$ are the same or different organic monovalent radicals, wherein at least one of the monovalent radicals organic side groups is a $C_1$-$C_6$-alkyloxy and/or an aryloxy group.

* * * * *

UNITED STATES PATENT AND TRADEMARK OFFICE
CERTIFICATE OF CORRECTION

PATENT NO. : 9,745,476 B2
APPLICATION NO. : 14/903883
DATED : August 29, 2017
INVENTOR(S) : Anderson et al.

It is certified that error appears in the above-identified patent and that said Letters Patent is hereby corrected as shown below:

In the Claims

In Column 20, Line 16, please delete:
"by."

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*